Aug. 25, 1959  H. L. SUPPER  2,900,749
CALENDAR DEVICE
Filed Jan. 28, 1958
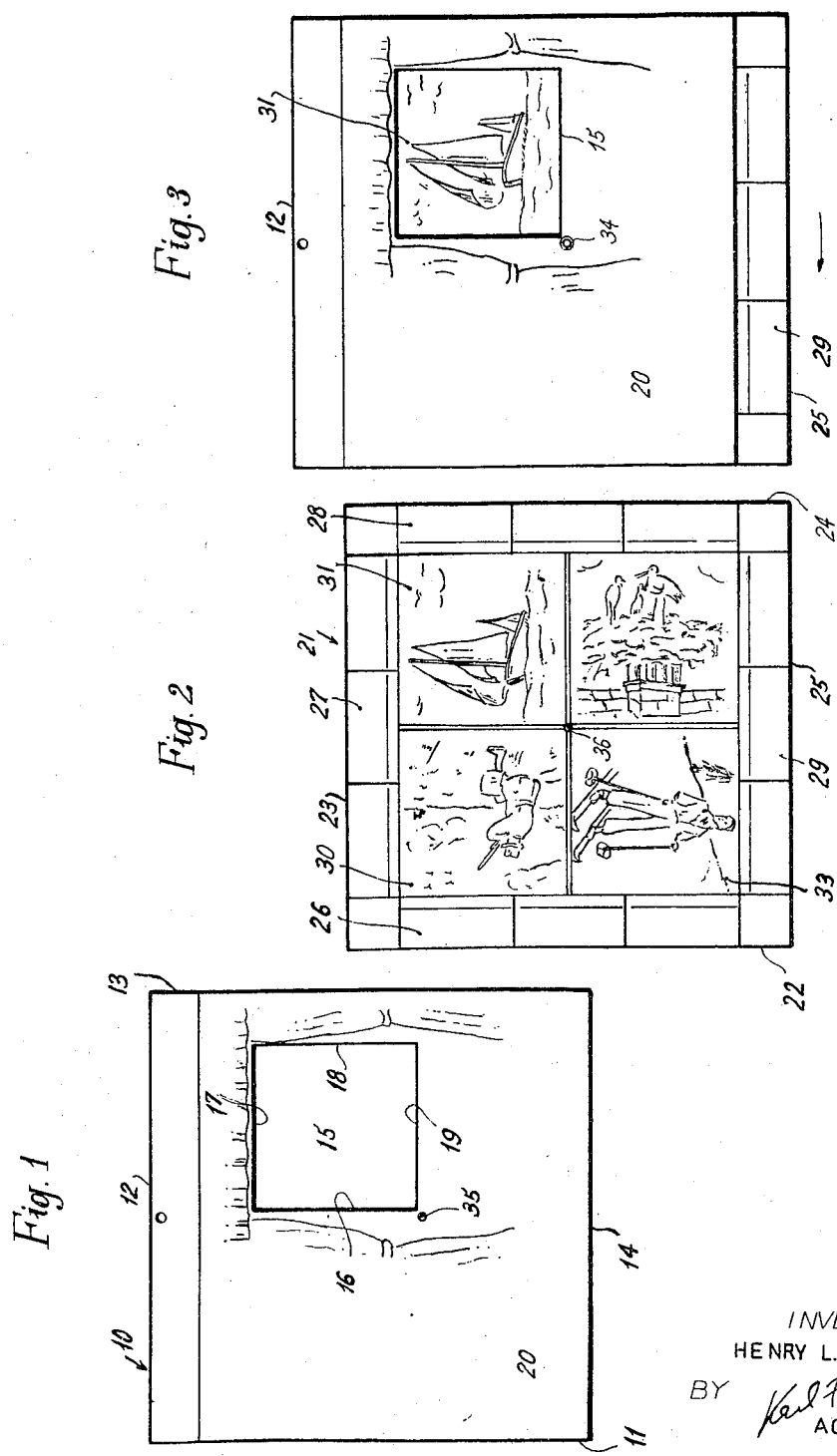
INVENTOR
HENRY L. SUPPER
BY
AGENT : 2,900,749
Patented Aug. 25, 1959

2,900,749

CALENDAR DEVICE

Henry Lucien Supper, Bar-sur-Aube, France

Application January 28, 1958, Serial No. 711,690

Claims priority, application France February 1, 1957

2 Claims. (Cl. 40—114)

This invention relates to a calendar.

A novel calendar device according to the invention is characterized in that it comprises two superimposed sheets, plates, or similar elements, e.g. cardboard sheets, a viewing aperture formed in a front one of said sheet elements, means pivoting the rear element relatively to the front element so as to allow said rear element to present through said viewing aperture illustrated frames or the like each corresponding to a part of the year designated on other portions of said rear element so positioned as the come into view simultaneously with said illustrated frames in the corresponding positions of the rear element.

The invention will be clearly understood from the ensuing description of an exemplary embodiment thereof illustrated in the accompanying drawings, wherein:

Fig. 1 illustrates one constituent element of the calendar;

Fig. 2 shows the other constituent element, and

Fig. 3 illustrates the assembled elements providing a complete calendar.

A calendar device according to the invention comprises as shown a front element 10 (Fig. 1) desirably of rectangular shape, the four sides thereof being designated 11, 12, 13 and 14. Formed in element 10 is a viewing aperture 15 preferably square, the four sides being designated 16, 17, 18 and 19, stamped out of the sheet. Any desired printed matter including lettering and illustrations may if desired be provided on the front or visible face of said front element. A rear element 21, e.g. a square cardboard sheet, is shown in Fig. 2 as having the four sides 22, 23, 24 and 25.

Provided on each of four marginal bands 26, 27, 28 and 29 of the sheet 21 are printed designations each corresponding to a related quarterly period of the year. The inner square outwardly limited by said four marginal bands is subdivided into four squares 30, 31, 32 and 33 each of which corresponds in size to that of the aperture 15. Printed in each of these four squares is a picture or other subject matter which may desirably correspond to a corresponding one of the four quarterly periods of the year, in a manner presently explained. Both sheets are pivoted to each other, as by a metallic rivet or eyelet 34 extending through registering perforations 35 and 36 respectively formed in the sheets, the perforation 35 being positioned at the intersection of sides 16 and 19 of the aperture 15 and perforation 36 at the center of sheet 21.

In the position shown in Fig. 3 only the picture in the square 31 is visible through the aperture 15, since the pictures in the other three small squares are concealed by the sheet 10 which is opaque. Only the marginal band 29 of the sheet 21 is visible moreover since the remaining three marginal bands are likewise concealed by the sheet 10. Assuming for instance that marginal band 29 corresponds to the summer months then the picture provided in square 31 would be a summer scene.

On the sheet 21 being rotated a quarter of a turn with respect to sheet 10, e.g. in the clockwise direction indicated by arrow f, then the square 30 will be moved to a position registering with aperture 15 and will come into view while simultaneously the marginal band 28 assumes a visible position in registry with and at the lower part of the sheet 10. This marginal band 28 would bear calendar indications relating to the fourth quarter and the picture simultaneously appearing through aperture 15 might represent fall scenery.

Retainer means are provided, such as clips or an elastic band for example for resiliently blocking both sheets in each of their four positions of display.

It will be seen that my novel calendar is adapted to change at each season of the year, an attractive feature which can be conveniently used for advertizing purposes. It is extremely easy and inexpensive to make and is relatively rugged.

My invention may further include various devices having a general organization similar to that defined herein but wherein the printed matter may not necessarily relate to time divisions of the year.

What I claim is:

1. A calendar device comprising a rectangular first sheet element, a square second sheet element rotatably attached to the rear of said first element, the width of said first element being identical with the length of one side of said second element, and a pivot interconnecting said elements with freedom of relative rotation, said pivot being positioned centrally of said second element and along one axis of symmetry of said first element sufficiently displaced from the other axis of symmetry thereof to have different marginal portions of said second element project beyond an edge of said first element in successive relative positions of said elements 90° apart, said first element being provided with a window offset from said pivot, said second element bearing calendar indicia on said marginal portions and correlated messages viewable through said window on a central area framed by said marginal portions.

2. A calendar device as described in claim 1 wherein said window is rectangular and has a corner immediately adjacent said pivot, the sides of said window being parallel to the edges of said first element.

References Cited in the file of this patent

UNITED STATES PATENTS

| | | |
|---|---|---|
| 509,891 | Gore | Dec. 5, 1893 |
| 1,715,737 | Bradley | June 4, 1929 |